United States Patent
Green et al.

(10) Patent No.: US 11,635,929 B2
(45) Date of Patent: Apr. 25, 2023

(54) MEMORIAL FACILITY WITH MEMORABILIA, MEETING ROOM, SECURE MEMORIAL DATABASE, AND DATA NEEDED FOR AN INTERACTIVE COMPUTER CONVERSATION WITH THE DECEASED

(71) Applicants: Gary Green, Philadelphia, PA (US); Rod Ghani, Scottsdale, AZ (US)

(72) Inventors: Gary Green, Philadelphia, PA (US); Rod Ghani, Scottsdale, AZ (US)

(*) Notice: Subject to any disclaimer, the term of this patent is extended or adjusted under 35 U.S.C. 154(b) by 662 days.

(21) Appl. No.: 16/692,093

(22) Filed: Nov. 22, 2019

(65) Prior Publication Data
US 2020/0089455 A1  Mar. 19, 2020

Related U.S. Application Data (63) Continuation-in-part of application No. 15/903,780, filed on Feb. 23, 2018, now abandoned.
(Continued)

(51) Int. Cl.
*G06F 3/14* (2006.01)
*G06F 16/74* (2019.01)
(Continued)

(52) U.S. Cl.
CPC ............... *G06F 3/14* (2013.01); *G06F 16/74* (2019.01); *G06V 40/172* (2022.01); *G10L 17/00* (2013.01); *G10L 25/63* (2013.01)

(58) Field of Classification Search
CPC ... E04H 13/006; E04H 13/001; E04H 13/008; A61G 17/08; A61G 17/048; A61G 17/02;
(Continued)

(56) References Cited

U.S. PATENT DOCUMENTS

| 617,161 | A | ‡ | 1/1899 | Hunter | ................... E04H 13/00 52/133 |
| 919,126 | A | ‡ | 4/1909 | Chesrown | ....................... 109/78 |

(Continued)

FOREIGN PATENT DOCUMENTS

| CN | 104660674 A | | 5/2015 |
| JP | H0754521 A | ‡ | 2/1995 |

(Continued)

OTHER PUBLICATIONS

English Abstract for JP H0754521 A (1995).‡
English Abstract for JP H06193313 A (1994).‡

*Primary Examiner* — Chenea Davis
(74) *Attorney, Agent, or Firm* — Mark V. Loen (57) ABSTRACT

The embodied invention is a multi-vault memorial facility with a memorial room and an interactive system for storing and providing memorial information of the deceased. The meeting room includes memorabilia and access to a secure personal biographical database which includes historical and personal information about the deceased. An interactive user interface for a visiting person is used when at the facility. The personal biography database security is provided by administration control for access and identifies who can modify the database.
The interactive user interface utilizes visual and audio presentations, and a conversational user interface with a likeness and a digital memory of the deceased. A computer projection talks with a visitor and mimics responses of the deceased.

37 Claims, 10 Drawing Sheets

Related U.S. Application Data (60) Provisional application No. 62/923,514, filed on Oct. 19, 2019.

(51) Int. Cl.
   *G10L 25/63* (2013.01)
   *G10L 17/00* (2013.01)
   *G06V 40/16* (2022.01)

(58) Field of Classification Search
   CPC ...... A61G 17/044; G06V 40/172; G06F 3/14; G06F 16/436; G06F 16/433; G06F 16/4393; G06F 16/74; G10L 25/63; G10L 17/00; G09G 2354/00
   USPC .......... 52/128, 133, 134, 135, 136, 137, 139
   See application file for complete search history.

(56) References Cited

U.S. PATENT DOCUMENTS

| | | | |
|---|---|---|---|
| 934,764 A ‡ | 9/1909 | Simpson | E04H 13/006 264/DIG. 57 |
| 1,020,747 A ‡ | 3/1912 | Dietz, Jr. et al. | E04H 13/006 52/134 |
| 1,096,758 A ‡ | 5/1914 | Rogers | E04H 13/005 52/132 |
| 1,453,375 A ‡ | 5/1923 | Allen | E04H 13/006 52/134 |
| 3,642,339 A ‡ | 2/1972 | Ruderfer | A47B 55/04 211/151 |
| 3,897,663 A ‡ | 8/1975 | Gaul | E04H 13/006 52/136 |
| 3,898,718 A ‡ | 8/1975 | Eubank | A61G 17/00 27/35 |
| 3,945,094 A ‡ | 3/1976 | Daran | E04H 13/005 27/11 |
| 3,978,627 A ‡ | 9/1976 | Booth | E04H 13/00 52/136 |
| RE29,532 E ‡ | 2/1978 | Zwick | E04H 13/006 220/378 |
| 4,688,359 A ‡ | 8/1987 | See | A61G 17/08 52/134 |
| 4,727,632 A ‡ | 3/1988 | Yearsley | A61G 17/00 27/35 |
| 4,780,994 A ‡ | 11/1988 | Chen | E04H 13/00 52/134 |
| 4,862,655 A ‡ | 9/1989 | LePage | E04H 13/005 52/136 |
| 4,922,590 A ‡ | 5/1990 | Yearsley | E04H 13/006 27/19 |
| 5,408,786 A ‡ | 4/1995 | Konno | E04H 13/006 52/128 |
| 5,568,677 A ‡ | 10/1996 | Tobin | A61G 17/036 27/17 |
| 5,622,014 A ‡ | 4/1997 | Weiss | A61G 17/08 52/105 |
| 5,659,932 A ‡ | 8/1997 | Wright | A61G 17/048 27/7 |
| 5,722,133 A ‡ | 3/1998 | Farris | A61G 17/0136 27/17 |
| 5,979,124 A ‡ | 11/1999 | Branan | E04H 13/006 52/134 |
| 6,253,503 B1 ‡ | 7/2001 | Flood | E04H 13/00 27/19 |
| 6,681,534 B2 ‡ | 1/2004 | David | E04H 13/00 27/1 |
| 6,799,399 B2 ‡ | 10/2004 | Dudek | E04H 13/00 27/7 |
| 7,287,225 B2 ‡ | 10/2007 | Mindrum | G06Q 10/10 715/71 |
| 8,214,978 B1 ‡ | 7/2012 | Moran | A61G 17/034 27/14 |
| 8,240,013 B2 ‡ | 8/2012 | Williamson | A61G 17/00 27/2 |
| 8,640,311 B2 ‡ | 2/2014 | Nihipali | A01N 1/00 27/21 |
| 8,955,205 B2 ‡ | 2/2015 | Beliveau | A61G 17/0076 27/11 |
| 9,138,367 B2 ‡ | 9/2015 | Thacker | A61G 17/02 |
| 9,160,782 B1 | 10/2015 | Meagher | |
| 9,350,425 B1 ‡ | 5/2016 | Lewis | H04B 5/0031 |
| 9,458,643 B2 ‡ | 10/2016 | Young | E04B 1/34807 |
| 9,465,812 B1 | 10/2016 | Robinson | |
| 9,480,617 B1 ‡ | 11/2016 | Cook | A61G 17/04 |
| 10,628,635 B1 * | 4/2020 | Carpenter, II | G10L 13/02 |
| 10,853,717 B2 | 12/2020 | Abramson et al. | |
| 2001/0036354 A1 ‡ | 11/2001 | Majors | H04N 21/4622 386/23 |
| 2002/0144471 A1 * | 10/2002 | David | E04H 13/006 52/103 |
| 2003/0005326 A1 * | 1/2003 | Flemming | G07C 9/37 726/4 |
| 2003/0137537 A1 * | 7/2003 | Guo | G10L 15/1822 704/E15.04 |
| 2004/0221435 A1 ‡ | 11/2004 | Pentz | A61G 17/00 27/35 |
| 2005/0204300 A1 | 9/2005 | Mindrum | |
| 2006/0236326 A1 ‡ | 10/2006 | Aguirre | G06F 1/1635 719/32 |
| 2008/0255988 A1 ‡ | 10/2008 | Maltese | G06Q 10/10 705/39 |
| 2010/0186207 A1 ‡ | 7/2010 | Moore | A61G 17/036 27/1 |
| 2011/0030289 A1 ‡ | 2/2011 | Rossi | E04H 13/006 52/133 |
| 2011/0126480 A1 ‡ | 6/2011 | Tsao | E04H 13/006 52/133 |
| 2013/0019544 A1 ‡ | 1/2013 | Ng | E04H 13/00 52/133 |
| 2013/0199111 A1 ‡ | 8/2013 | Eickhof | E04H 13/006 52/134 |
| 2013/0332563 A1 ‡ | 12/2013 | Yuen | E04H 13/008 709/21 |
| 2014/0259577 A1 ‡ | 9/2014 | Richardson | A61G 17/06 27/28 |
| 2015/0007307 A1 | 1/2015 | Grimes | |
| 2015/0218844 A1 ‡ | 8/2015 | Adair | E04H 13/001 705/26 |
| 2015/0308141 A1 ‡ | 10/2015 | Ugartechea Berlanga | A61G 99/00 52/135 |
| 2016/0002948 A1 ‡ | 1/2016 | Galarza | E04H 13/003 386/23 |
| 2018/0176160 A1 ‡ | 6/2018 | Steller | H04L 67/1095 |
| 2018/0197436 A1 ‡ | 7/2018 | Sweeney | G09B 19/0046 |
| 2018/0293483 A1 * | 10/2018 | Abramson | H04L 51/02 |
| 2018/0309865 A1 ‡ | 10/2018 | Choi | H04L 51/14 |

FOREIGN PATENT DOCUMENTS

| | | | | |
|---|---|---|---|---|
| JP | 2010211334 A | | 9/2010 | |
| JP | WO2014203932 | | 12/2014 | |
| KR | 20090110761 | | 10/2009 | |
| KR | 20180137745 A | | 12/2018 | |
| WO | WO-2004100849 A2 ‡ | 11/2004 | | A61G 17/00 |
| WO | WO2014049545 A1 | | 4/2014 | |
| WO | WO-2014 A1 ‡ | 12/2014 | | |
| WO | WO-2014203932 A1 ‡ | 12/2014 | | E04H 13/008 |
| WO | WO-2017124125 A1 ‡ | 7/2017 | | E04H 13/00 |

\* cited by examiner
‡ imported from a related application

MEMORIAL FACILITY WITH MEMORABILIA, MEETING ROOM, SECURE MEMORIAL DATABASE, AND DATA NEEDED FOR AN INTERACTIVE COMPUTER CONVERSATION WITH THE DECEASED

CROSS REFERENCE TO RELATED APPLICATIONS

This application claims the benefit of provisional application No. 62/923,514 filed on Oct. 19, 2019 and is a continuation in part of U.S. patent application Ser. No. 15/903,780 filed on Feb. 23, 2018. Both of these prior applications are incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to memorial facilities, such as mausoleums, where the remains of deceased are kept.

(2) Description of Related Art

A mausoleum is a building, especially a large and stately one, housing a one or more tombs. These alternatives to ground burial are used by families throughout the world and continue to gain popularity in the United States. Mausoleums are especially common in countries where ancestors are revered.

Over the course of a life, a treasure trove of memories and experiences are stored in photo albums, film, video tape, written letters, and other non-digital media. Often these items are spread out in different locations, with no descriptions to help future generations understand how an individual lived and who they were. As technology changes, descendants are often left with no way to even view film or video that relied on now-obsolete devices to watch them. Additionally, smartphones store hundreds if not thousands of photos, videos, and other content, with no context that would make them meaningful to future generations. Thus, families risk losing the chance to truly cherish a legacy and feel close to that person after death.

When we visit a ceremony or other memorable location, there is no ability to learn about that person based on the structure of a cemetery. Essential items like electric power, restrooms, a quiet room, the ability to be private, and the wish to be there no matter the weather.

Also, when a cemetery or other memorable location is visited, it is not possible to experience speaking with the deceased individual and have a conversation. It would be helpful to speak with the deceased individual through a computer representation and have the representation talk about their life with the visiting relative. It is most desirable to have a conversational interface with the computer representation of the deceased. To that end, a 2D or a 3D projection of the departed relative is desirable to facilitate a better conversational interface.

BRIEF SUMMARY OF THE INVENTION

The embodied invention is a multi-vault memorial facility with a memorial room and an interactive system for storing and providing biographical information of the deceased. The meeting room includes memorabilia and use of a secure personal biography database which includes historical and personal information about the deceased. An interactive user interface for use by the visiting person is included, and the interface is accessible when at the facility.

A Biographical Database for the deceased information is secured by administration control, where a designated person sets up access, and identifies who can modify or add to the database.

A processor with software commands is configured to provide the memorial information via the interactive user interface upon an occurrence of an associated playback event, such as arriving in a memorial room. Additionally, a Global Positioning System transmitter and receiver in connection with memorial information is provided to assure the visiting person is identified correctly. For improved security, private information about the deceased is only accessible when in the memorial room.

The interactive user interface within the room is used to explore stored visual and audio information of the deceased. The user interface includes a conversation with a likeness and a voice of the deceased, and computer artificial intelligence is employed to create the conversation based on the personal biography database of the deceased. Parallel software engines running on parallel processing threads are deployed to provide the needed conversational user interface.

DETAILED DESCRIPTION OF THE INVENTION

Figure 1:
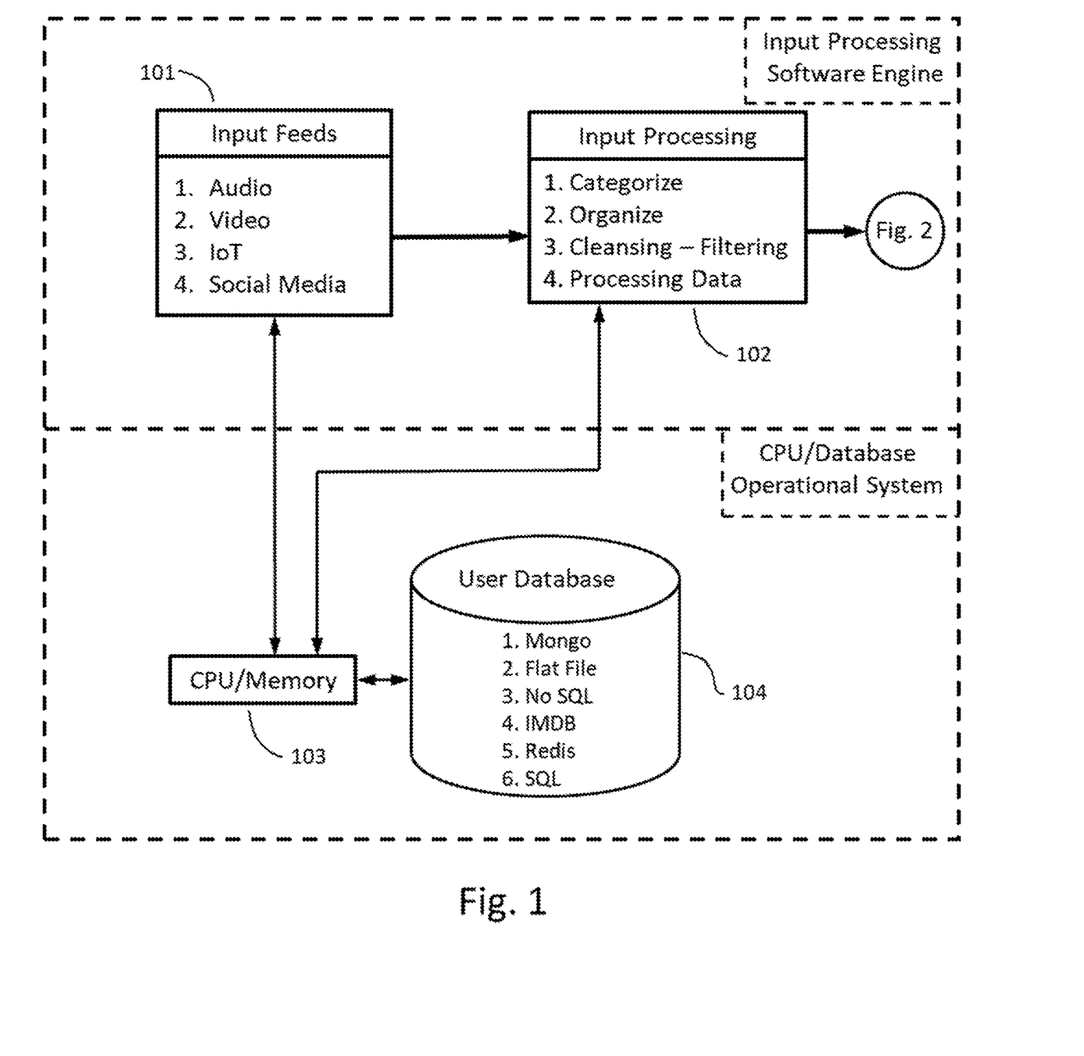
FIGS. 1-3 show how a private and secure computer simulated conversation is developed.
Figure 2:
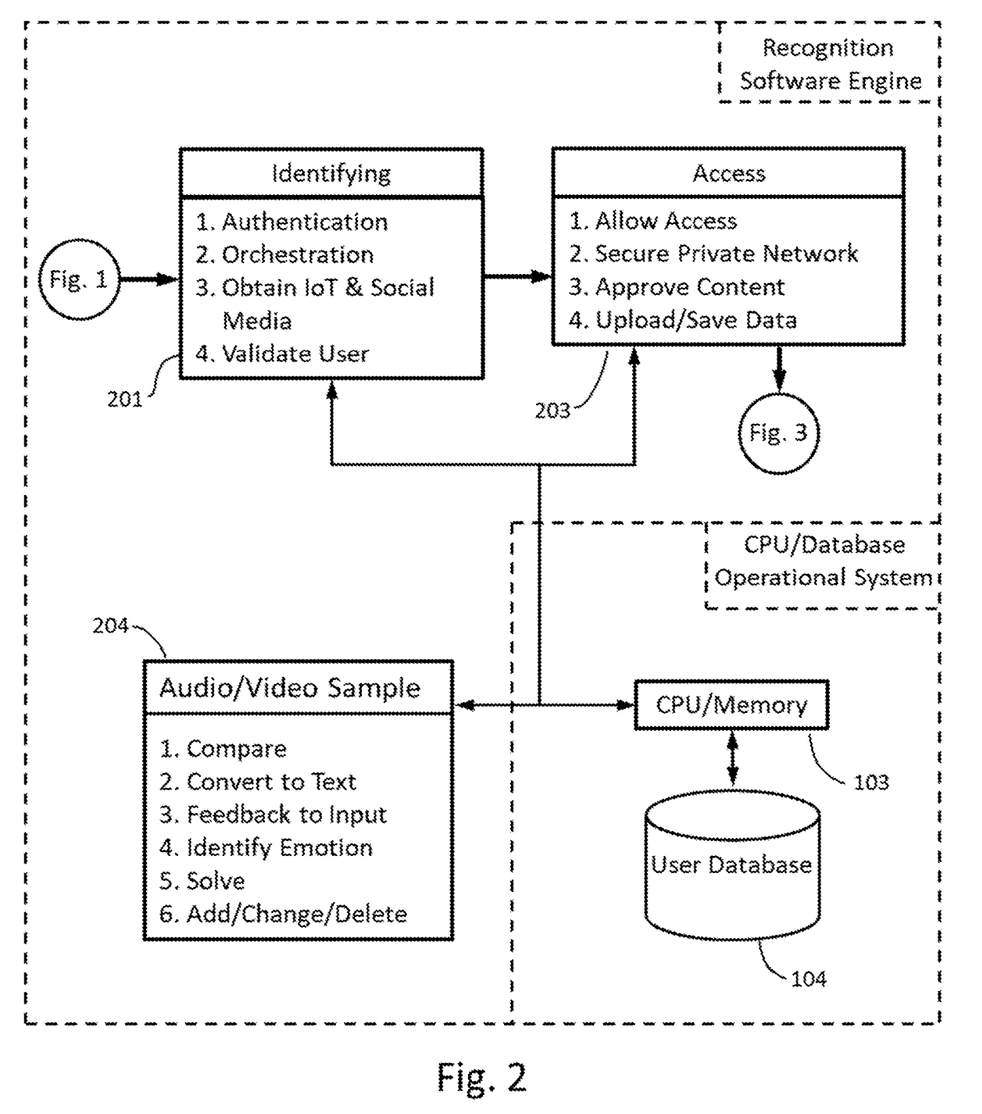
Figure 3:
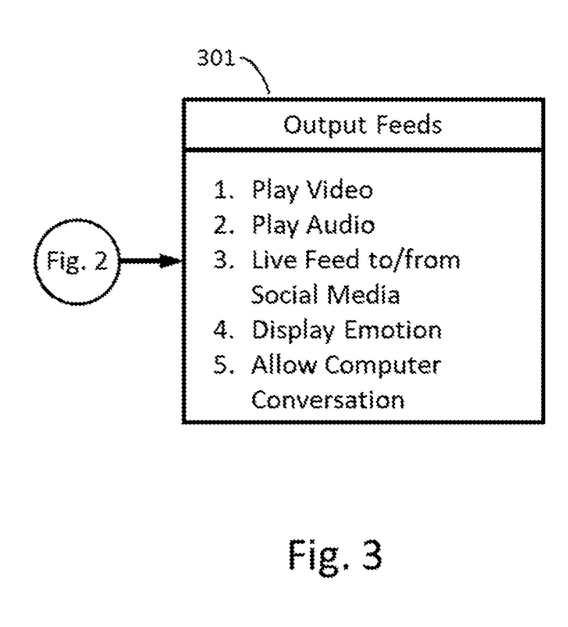

FIGS. 1-3 shows a software overview that is used for a private, secured conversation.

In FIG. 1, an input processing software engine is used to receive input feeds 101 from audio conversation from an individual (visitor), a video feed from the person talking, as well as background data from general information of things from the internet and from social media. The background data would be from videos, pictures, and comments posted on social media by people who are authorized and known by the deceased or family.

This information is processed 102 by categorizing the type of data (i.e. file type, location of origin if known, date created if known) and organized into folders by data types, dates, and location. The files are processed by the CPU/Memory 103 which communicates with the User database 104, the input processing 102, and the input feeds, 101.

The input feeds 101 are additionally processed by cleansing—filtering when the file is not clear. This happens when there is background noise when the person is speaking, or the person speaking has a cold and their voice is unclear. The voice feed is converted to text and the text is scanned for problems. It is corrected if possible or marked as unclear.

The video and audio are then processed as shown in FIG. 2. The inputs used to identify the visitor 201, include authentication (see FIGS. 3-301). This function identifies the visitor who wishes to have a computerized conversation by utilizing an audio or image match to a sampled database at a predetermined probability. The use of two type of authentication (picture/video, voice) provides a confirming identification. Audio and image methods of matching a voice to a person and a face to a person are known in the art.

The authentication is orchestrated by comparing the voice and picture to items available to the authentication database. The voice and visual information will have to be chosen in a way that makes sense for authentication. That is, a frontal facial view or a side view, checking the voice for known words or phrases to improve certainty. Alternately, the information can be obtained from known places on the internet, and social media.

Once the person is identified, they are permitted access 203 to the secure private network. The visitor is validated and any additional information from the conversation is approved content that can be stored (uploaded) to the user database 203.

The lower dashed box is the audio video sample database, primarily comprising the hardware components that are used by the recognition software engine. This area shows software processing functions 204 that interface with the user database 104. This includes software engines that compares the video/audio to known samples stored on the user database 104. The audio is also converted to text suitable for storage. There is feedback to the input 201 and the visitor being authenticated may be asked to speak again when the audio is garbled, or the face needs to be repositioned. The emotion of the visitor speaking is assessed by laughter, crying, intensity (volume) in comparison to other words, and the speed of the speech.

The video and audio are then published as shown in FIG. 3 as output feeds 301. The output feeds are displayed:
  a. on a monitor with voice attached
  b. on a 2D or 3D computer projection of the deceased image
  c. on a visitor's mobile device
  d. live feed into social media In an important embodiment, the image of the deceased displays emotion based on the appropriate response. The image will smile or show empathy, for example.

Memorial Building for the deceased.

In an important embodiment of the invention, a Memorial Building preferably includes multiple visiting rooms, along with storage facilities for the remains of the deceased.

Figure 4:
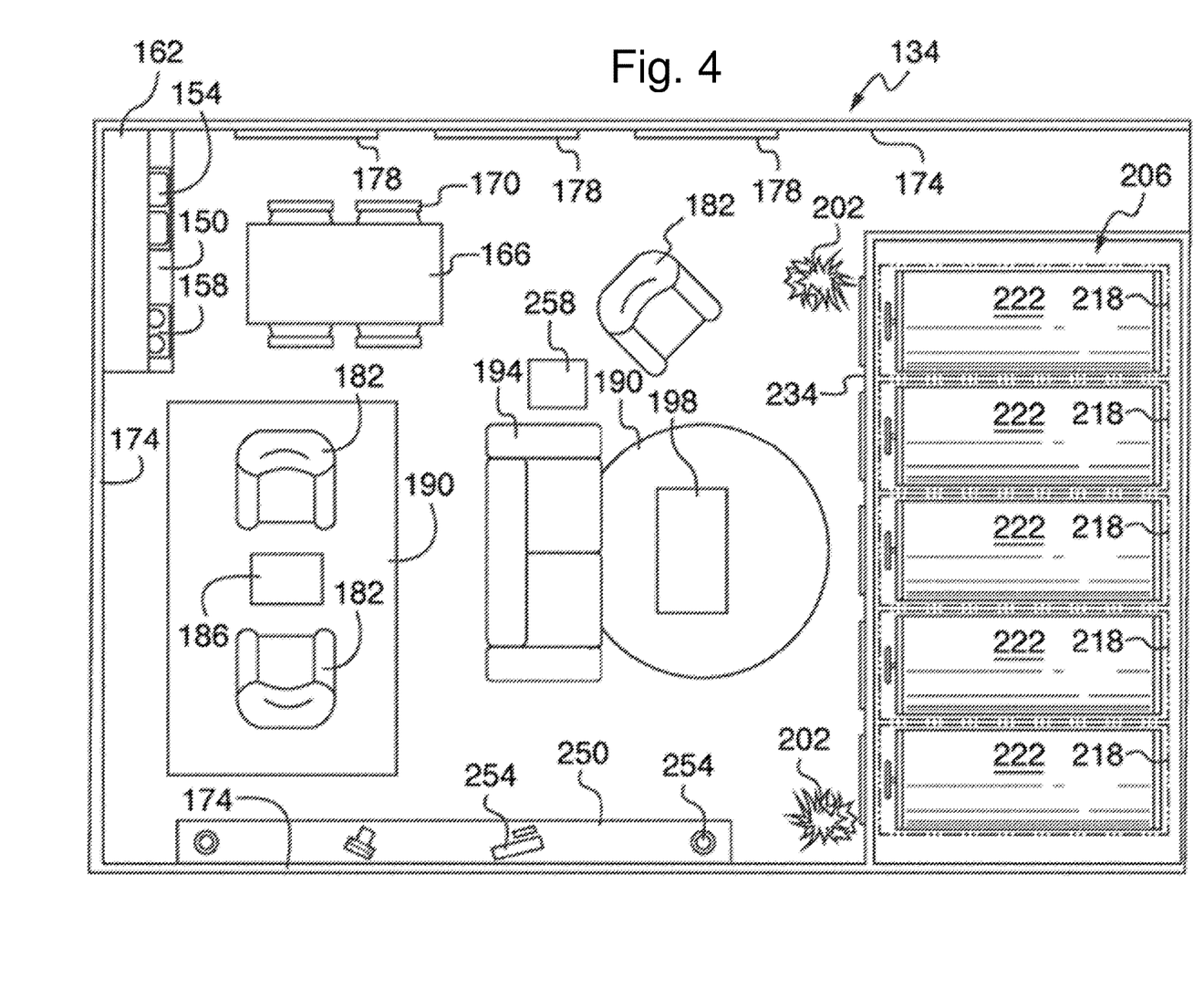
FIGS. 4-6 show a typical memorial room and a number of basic features.
Figure 5:
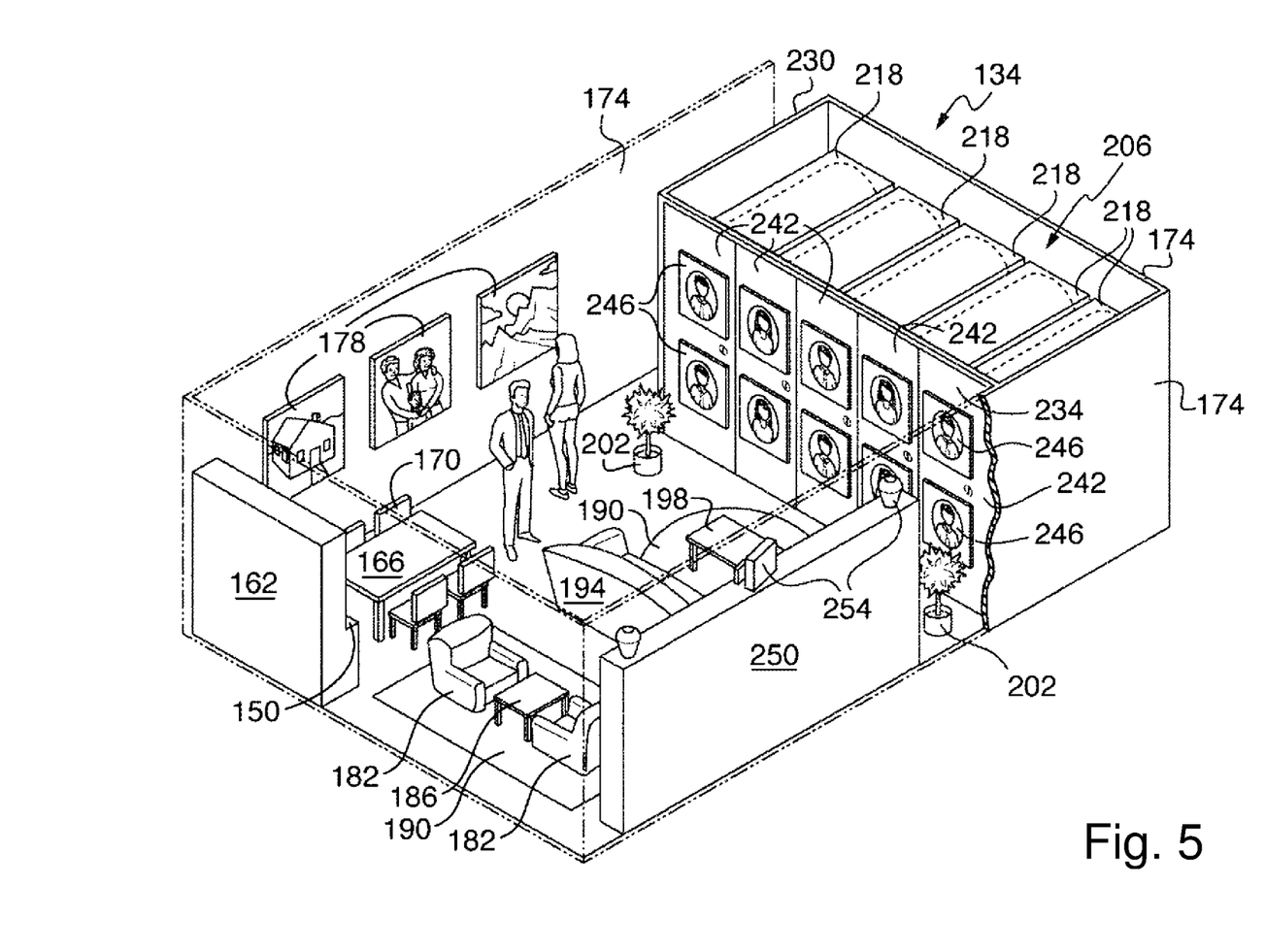

Referring to FIGS. 4 and 5 the details of the memorial suite 134, which may be located on the ground floor or any upper floors of a multi-floor building structure, are discussed. The memorial suite 134 is arranged to provide comfort, revive memories, or impart information about the decedents, and identify things with which decedents were associated. For example, the memorial suites 134 may resemble the familiar surrounds of a residential home and may include portions that correspond to living areas of a residential home, such as a living room, kitchen, and/or bathroom. Or, there may be shared bathroom facilities on each floor of the facility 10 where multiple memorial suites 134 exist on a common floor. The memorial suite 134 may be a single room or several connected rooms, or it could be an entire floor of a building, or an entire building. The memorial suite 134 may be utilized as a family room, meeting room, community room, museum, or party room to share memories of the departed in an enhanced manner, utilizing multi-media technology such as audio, computerized and digital recordings, as well as artifacts, mementoes, photographs, and other associational histories in a private and environmentally-controlled and safe setting resembling a living room, den or other style room decided on by the owners of the memorial suite 134.

As shown in FIGS. 4-5, the memorial suite 134 is illustrated as a single room and includes an optional kitchen area having physical objects customarily found in a residential kitchen which may include but are not limited to a countertop 150 including a working sink 154 (FIG. 4) and a working stove top 158 (FIG. 4), a cabinet 162 with space for storing glassware, dishes, and kitchen utensils, and a table 166 surrounded by kitchen chairs 170. Other amenities such as for example a microwave oven or a conventional oven could be provided. In this manner, family members and loved ones of a decedent can prepare meals while visiting the memorial suite 134. One or more walls 174 of the memorial suite 134 may include wall hangings 178 such as photographs, portraits, or the like depicting an image of a decedent or a favorite object, place or memory to serve as a reminder of, or to pay tribute to one or more deceased family members. In addition, monitors, computers, electronic tablets and similar devices may be built into the walls or placed on tables or ledges to enable the storage and viewing or listening to written, graphic, video and sound records to inform visitors about the decedents; and Internet access would allow cloud storage of the data as well as access at the situs of the memorial suite, and remotely via the Internet or a network; and in addition there could be curated access to web sites that would be relevant to each decedent's lifestyle, values, beliefs, associations and biography to further inform the visitors about the decedents.

The memorial suite 134 may also include areas designed for comfort, meetings or to represent and revive memories or iconic aspects of the lives of the decedents. For example, a memorial suite could resemble a living room or family room, a lobby, salon, man cave, den, office, the interior of a boat, or other interior space decorated and arranged to resemble either a place that would be identified with the unique experiences and lives of the decedents or a specific theme. By way of further example, if the memorial suite 134 is designed to resemble a residential living room, it could be furnished with customary furnishings such as comfortable upholstered chairs 182 situated on opposite sides of a small table 186, rugs 190 of differing sizes and shapes, a sofa 194, a cocktail-height table 198, an end table 258, and decorative plantings 202. Alternatively, each memorial suite 134 may be provided with decorative flooring or carpeting. In addition, climate control and other comforts and amenities customarily found in a home could be provided within the memorial suite 134 to facilitate gatherings of mourners and friends. Each memorial suite 134 may be furnished with electrical power, heating, ventilation, cooling, air conditioning, plumbing, Wi-Fi connection and other comforts typically found in a home.

In addition, the memorial suite 134 may include other areas or rooms typically found in a residential home, e.g., a bathroom (not shown). In addition, the memorial suite 134 may include shelving 250, for example, in the form of bookshelves which may be used for displaying memorabilia or mementoes 254 of one or more deceased family members. For example, a stamp collection (not shown) treasured by a departed family member could be displayed on the shelving 250 for viewing by surviving family members and friends to give survivors a better sense of the departed and their interests so as to evoke memories. Likewise, the shelving 250 could display a deceased family member's collection of books, hobbies, or musical instruments, tobacco pipes, etc. The shelving 250 could support a stereo system or similar device for playing music a deceased family member cherished during his or her lifetime. Likewise, a flat screen television (not shown) could be provided on the shelving 250 or mounted on a wall to display images or videos of a deceased family member during his or her life or other subject matter to evoke memories. The shelving 250 could also be utilized for displaying other items typically found in a living room or den of a home.

Referring to FIGS. 4-5, the memorial suite 134 also includes a storage area 206 for storing the remains of a decedent. The storage area 206 may be comprised of a plurality of generally horizontally oriented shelves including one or more upper shelves and one or more lower shelves. The shelves are provided to support one or more receptacles 218 situated thereon. As the interment needs of a family grows or needs change, additional receptacles 218 may be stored within the storage area 206. The memorial suite 134 and the storage area 206 are intended to be highly customizable, allowing for a method to adjust the interior space and for the storage area 206 to be reduced or enlarged depending on circumstances and needs. For example, a second storage area 206 could be added to accommodate more decedents than depicted in FIG. 4. As needs change, receptacles 218 may be added or removed from the storage area 206.

Figure 6:
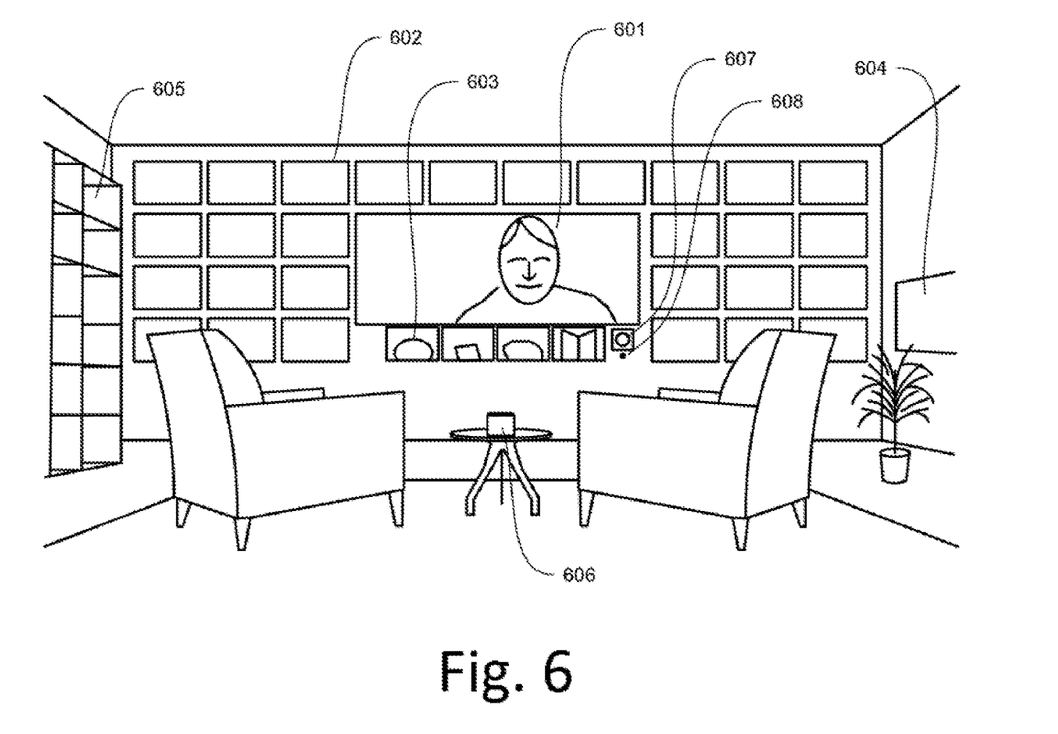

Each receptacle 218 is arranged for containing an interment vessel 222, discussed in detail below, containing the remains of a decedent. Alternatively, the receptacle 218 could be arranged for containing an air-tight, secure conventional casket (not shown). Each receptacle 218 is in the shape of an elongated box that is formed of a front face 218*a*, a top face 218*b*, a bottom face 218*c*, side faces 218*d* and 218*e*, and a back face. The front face 218*a* is hingedly connected to the receptacle 218 and is arranged to swing between closed and opened positions. In FIG. 6, the front face 218*a* is in the closed position, and in FIG. 7, the front face 218*a* is shown in the opened position. In this manner, service personnel may open the front face 218*a* of the receptacle 218 to gain access to and remove a casket (not shown) or interment vessel 222 housed therein such as during a funeral or for transporting the casket (not shown) or interment vessel 222 to a new location in the event a family relocates. The front face 218*a* may be returned from the open position to the closed position once service personnel have removed the casket (not shown) or interment vessel 222 from the receptacle 218 or have finished placing the casket (not shown) or interment vessel 222 into the receptacle 218. Removing an interment vessel 222 from a memorial suite 134 during a family relocation is a major improvement over the prior art which would require unearthing a buried casket which would then need to be cleaned off prior to transport, which would be expensive and disruptive.

The tribute wall includes a metal frame, e.g., steel or aluminum frame, with multiple, e.g., five, locking doors 242 hingedly mounted thereto, the locking doors 242 being arranged to swing between closed and opened positions. A lock on each door 242 is indicated at 242*a*. In this manner, service personnel may unlock the doors 242 to gain access to the receptacles 218 located within the storage area for removal. The storage area 206 is located in a corner of the memorial suite 134 where it is surrounded by walls including a partition wall 230, and a tribute wall 234. Optionally, photographs 246 of the deceased may be placed on the tribute wall.

A view of another embodied memorial room is shown in FIG. 6. There is a main monitor 601 which shows pictures, slides, videos, etc. from the personal biography of the deceased. Or it shows a computer simulated 2D image of the deceased for conversational purposes. There are additional monitors or photographs 602 of the deceased that are associated with the personal biography. Memorabilia items 603 are available for viewing. Shelves 605 are used for other memorabilia or photos, and the remains 606 may be present for viewing if desired or arranged. Additionally, an enclosed sepulcher 604 contains the remains of the deceased when not out for display. Alternately, the sepulcher is located elsewhere in the memorial building.

For a conversation with a simulated image of the deceased, a camera 607 with a microphone 608 is utilized. More than one camera/microphone may be placed in the room.

Database Input and Management, Including Security

The highly secured database includes geofencing for security to ensure that database is not altered by unsecured individuals. Geofencing in this case means that the person altering the database is at a predefined location before database entries are accepted. For example: this includes verification from a known computer IP address or the response of a smart phone with a global positioning sensor.

a. Administration control by family member. The administrator is picked by family members and establishes who can add or view content    b. Ability to add content by using a highly secured database located in a secure network    c. Administrator reviews content and retrieves content based on roles and responsibility    d. Hotel Cemetery call that identifies land location or space in condo    e. Highly secure private network for each family using Geo Fencing with 128 bit encryption    f. Ability to retrieve data based on consumer type    g. Ability to load data using AI artificial intelligence using Facial recognition and voice recognition with database sampling comparators. Each authorized user will have a minimum of 150 samples in their record, with over 92% success match in video face recognition, and 71.7% of audio match, based on results of an algorithm sampling success rate.

h. Ability to leverage Geofencing location by authorizing content delivery for any consumer of data and or organizer of data.

Adding Content—Personal Biography App

A Biography App is a way for older family members to preserve and share precious moments that their children will treasure as adults. Precious personal moments can be captured and added to the Biography App. For example, a wife and husband have many joyful experiences and memories which they wish to share with family and future generations. Their collection includes:
1. Video such as recordings by mobile phones, 8 mm film, and video tape (VCR)
2. Images such as photographs in paper or digital form
3. Items handmade such as paintings, drawings, crafted items, blankets, etc. which are recorded by an image or notes.
4. Written letters via paper, email, cards, and correspondence.
5. Documents and mementos such as gifts, education, awards, souvenirs, trophies, certificates, plaques, newspaper articles, social media postings, etc.

They can upload all this information to their personal biography database.

When the media and is uploaded to a database, facial recognition and optical character recognition algorithms automatically categorize and organize each item by content, date, and file type. The information can be edited by the user by adding descriptions and searchable meta tags. The material is added to a timeline automatically based on creation date when uploads occur.

Most people utilize their smartphone to record everyday experiences and interests. The Biography App can be set up to add these experiences to their personal database automatically. All the user has to do is "share" the picture, video, email, text, tweet to the Biography App. A web page is created to collect and organize the user's information based on similar format and content.

The user can review their video and additional information (such as meta tags) to make it easy for others to find it on their Biography web pages. The user can grant permission for other trusted people to contribute or comment as well. This allows a user to load personal videos and content for their own legacy.

A mobile based biography program (biography app) allows relatives, families, and personal friends to create and preserve their life stories in one secure, convenient location. All individual and family records and memories are captured in digital form and organized for access by authorized family members and guests on their smartphones or other devices.

The PBA simplifies and provides for easy upload of photos, videos, text files, audio and other files to a personal database account. This includes uploading batches of already existing files as well as individual files created with other devices. When utilizing the PBA, the user navigates to files and uploads them using normal methods. The user can also upload files they have created, such as an information file (text), photos, and videos. The user simply clicks on file they wish to upload, and a PBA icon appears as an option alongside of social media sharing, mail, text message or other "send to" options.

Figure 8:
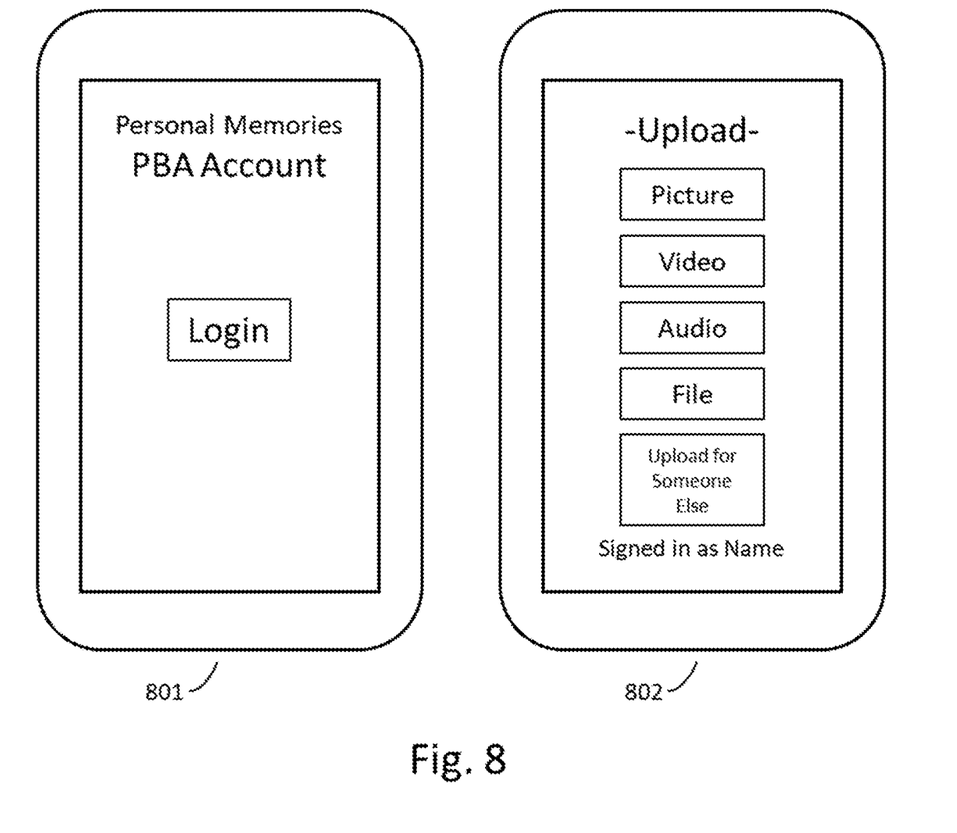
FIG. 8 shows two typical mobile phone screens for inputting information into their personal biography database.

FIG. 8 shows two exemplary screens utilizing a mobile phone to add information to their personal biography account. A login screen permits 801 access with a username and password. Then an update screen 802 can be utilized to upload a picture, video, or text file type to their account.

Downloading/Viewing. To easily download any content the user or guests are able to easily download any content, provided they are authorized.

Personal Biography Database Administration. The user has the ability to designate who controls their PBA account after death and serves as administrator.

Designate Heirs for PBA control. Ability to designate control of online accounts other than PBA, after death. Those accounts include linked accounts for social media, music, entertainment, online storage, other accounts. The user does this by providing login names, instructions, passwords, etc.

Guest Accounts. To make it easy for my friends and family to extract content from the personal biography database account, they set up their own guest account. The guest account simplifies content transfer (copy) content because it makes it an internal transfer within the personal biography database. The guest account has similar features to Client account such as viewing information and files, as well as uploading information they wish to add.

Personal Biography Database Editing—Text/Data Entry. The user can enter text directly into the PBA, such as biography information, tags or captions for photos and videos (identifying a location, date or people within the photo) and Emojis. The data is entered into the personal biography database utilizing labeling data fields.

Image editing. The user can crop and edit images within the app and make edits that include Emojis. Image editing includes rotating, color adjustment such as hue, saturation, and black/white conversion. The user can manipulate images to their personal tastes. These types of edits to images are known in the art.

Image/Video Compression. The PBA interface and includes methods for fast upload by use of file compression.

Web page personalization. The user is able to make adjustments to their personal biography webpage to make it more personal. The user can change colors, fonts, and other known edits to their individual web page. Edits to web pages are well known in the art.

Timeline. The user has the ability to show their history in one linear timeline, allowing others to view relationships and connections in the wider family member life events. Other account members can choose to allow all, some, or none of their personal information to appear alongside other members info in the timeline.

Secure Access to Personal Biography Database

The biography app connects to a Personal Biography Database Access using a secure login. This secures any Personal biography data from unauthorized access. The login preferably includes additional confirmation, such as sending a one-time login code to a personal phone. The use of a Multi-Factor login along with a secure password, improved security protects the data from unauthorized access or tampering. Also, a method for secure password recovery is included. Secure login methods are known in the art.

Security for Personal Biography Database. The personal biography data is additionally secured from unauthorized access by utilizing secure server protection. Additional passwords, encryption, and anti-virus protection are employed to prevent hacking.

Database backup. The personal biography data is backed up to protect the information in case of data corruption, malware, server failure, etc.

Access from current devices and platforms. The personal biography application (PBA) is available on multiple operating systems, which includes mobile platforms, web based (browser) programs, and tablet/laptop/desktop computers.

Based on each individual's permissions, other trusted people can view all or part of another's web page. Or, their pages can be kept private until a specified date. All member content can be searched and accessed individually, or via a timeline that allows visitors to view the entire family history and events in relation to each other.

Though family biographies can be accessed online, they are best experienced within the memorial room where the family members are interred. In lieu of headstones or plaques, each member can have a wall mounted monitor which displays video collages on a "Living Wall". Individual biography details can be viewed and explored on the main monitor as well. In this way, a visitor can treasure the memories of their departed loved ones surrounded by items and objects that were important to them.

Privacy security is an important goal of the embodied invention, and a number of additional steps are taken to keep the personal database secure as follows.

a. Geofencing is used for access. A geo-fence is a security method of creating a perimeter for information stored on a computer and restricting access to a particular real-world area. For example, the geo-fence would be based on the memorial room, or the administrator's house. The geo-fence could be dynamically generated by the location of a secure mobile phone, that is suitably authenticated, in a particular geographic location, such as a house. Another example is monitoring the secure mobile phone entering or exiting a geo-fence. The moving in and out of a geofenced area could trigger an alert to the device's user as well as messaging to the geo-fence administrator. This info, which might include the location of the device, could be sent to a mobile telephone or an email account.

b. Administrator (admin) control. Similar to database security. The administrator, when identified, is then given write/delete access to content, and the ability to add/delete users and establish their access to content.

c. Content providers and authorization for adding/editing. Similar to database security and additionally, the administrator establishes their access to content.

When a content provider logs in, that individual can add additional content to the personal database of the deceased.

Visitor Experience—Computer Generated Conversation

In an important embodiment of the invention, the memories of the departed are presented through a talking computer projection of the departed individual. A monitor and speaker are controlled by a software image engine and a software conversation speaking engine to project an image of the decedent and talk with a visitor. Preferably, the image is presented via computer animation, and the facial image responds normally when conversing with the visitor by smiling, frowning, etc. Preferably, the image is a 2D or 3D image of the deceased. In the case of a 3D image, the image is from a 3D TV, a laser projection, a holographic projection, or a 3D reality image using a headset.

To provide the needed functions for a conversational interface, a significant amount of computational capability is required, and multiple parallel software engines run simultaneously on parallel computational threads.

A Conversational interface with a visitor includes:
a. Voice recognition software engine by a computer with a central processing unit that:
  i. interprets the words of the visitor
  ii. identifies the voice affection of the user (i.e. mood and feeling)
b. A sentence selection software engine that picks the appropriate conversation response. The software engine that identifies a plurality of appropriate responses for various topic. Lists of usable sentences are kept in various catalogs. For example:
  i. a comforting sentence list: Comfort for troubles, asking for more information or "oh dear, tell me more . . . "
  ii. an information sentence list, for information for questions asked
  iii. a personal history sentence list: discussion about personal history, and explanations as to why they behaved and did what they did
  iv. a current event sentence list, to talk about current events (briefly 'did you hear about . . . ')
  v. a life lesson sentence list, Lessons from their life, things that inspired them
  vi. an inspiration sentence list
  vii. a personal biography event sentence list
  viii. a visitor personal history sentence list
  ix. a past events sentence list
  x. a conversation starter list that is able to start a conversation by asking a question, such as 'Why have you come to visit?'

When responding to the visitor who is commenting on a subject, a response is obtained from the biography database for closest logical response.
  a. use personal history of deceased, and visitor for the response
  b. use past events and current events for conversation, such as birthday, marriage, relationship, son, daughter, etc.

A linking software engine that links in other databases for
  a. Current and recent weather database
  b. Current local news database, such as bad accident or other current topic dominating the news
  c. Calendar of important family events such as school graduation, starting a job personal event that's important raise promotion etc. published book, etc.
  d. Known dates and other matters such as hobbies, marriages, sports events, birthday parties, etc. could be an event such as a hurricane An identity software engine identifies the individual the computer representation is speaking with.
  a. a voice recognition software engine that identifies the visitor.
  b. a facial recognition engine that identifies the visitor.
  c. A history software engine that recall events from prior conversations or from a history log The conversational computer representation of the deceased is additionally able to improve the biographical database by learning from conversations with visitors
  i. records conversations
  ii. Identifies facts from a conversation
  iii. Utilizes visual recognition of family by face or voice as they age
  iv. 'Good to see you' as a common greeting Typical Visitor Types to the Memorial Building:
a. A research visitor. This visitor can view statistics and reports that are no name base, no identity of family name or personal information. These people will be using the data of the database for their own research, and their clearance is established by the administrator.
b. Family and friends. Individuals who have been authenticated and have obtained security clearance to view and propose new content only. They cannot delete content. New content must be reviewed and published by the Administrator.
c. Close Family and friends. Individuals who have been authenticated and have obtained security clearance to view, add content, approve content, and publish it. This is essentially administrator clearance.

Types of Administrators:
a. Content organizer (Limited Admin): this person can add or delete content but can't change content. Also, can approve roles and view levels for content consumers.

b. Full administrator: this person adds, deletes, approves, and organizes content. The administrator also approves individuals for security clearance.

Leaving Messages to the Future

In another embodiment of the invention, an individual is able to leave private, future messages for family and friends. This is done by an audible or video recording and specifying the recipient, delivery date, event or even designating a specific location to trigger the message. This can occur long after their passing.

The PBA account includes the ability to leave private messages, including photo, audio, or video, for specific people that will only be accessed by those people. For an example: individual 1 creates a birthday message for each of his relatives. Or individual 1 creates a farewell message, that is made available after death. Or a message that is delivered when the recipient is at a specified location, such as the Memorial facility, someone's home, or famous landmark.

Personal Biography Database Social Connections and Messages

Import or incorporate social media. Some individuals spend a lot of time documenting their lives through social media, along with accompanying documentation. In an embodiment of the invention, an individual has the option to import social media posts and connect their social media accounts to their PBA. They can link their PBA to various social media accounts. Additionally, the have the ability to import and archive posts, tweets, etc. into searchable database. This feature can remain long after the person is deceased, providing for improved computer generated conversations.

Invite and Manage Guests

The administrator of a PBA account has the ability to link other PBA accounts so that another person's biographical information can be added. The administrator sends other individuals' email and/or text invitations that allows them to login and add to a PBA account. There will be limits to which areas the Guest PBA can access, which is controlled by the administrator. The administrator has ability to revoke access by any PBA account.

Create Messages for Specific People

Notification of Death

Ability for App to enact certain functionality when Client has died. A date entry field for death date that, when saved, allows post-life functionality to begin. For example, making private messages available to designees, or making information available on Heritage Gallery Video Wall.

Content creation. In another embodiment, a content creator that uploads content for another person has to have the information approved. To that end, the content creator must be identified and authorized for uploading, and then their uploaded information is reviewed-approved by the administrator. Once the content is approved, it can be viewed by visitors according to their access ability.

Content display is played for a visitor by a verbal interface, or by a touch screen/mouse/computer/mobile phone interface.

The operating system is just the operating system Lennox Microsoft etc. These types of operating systems are known in the art.

The database preferably utilizes mongo flat file, that is additionally supported by the computer operating system and hardware system. The operating system is flexible to whatever programs need to run.

That's the sample database and it has a comparative engine it has a convert to text engine and has feedback to input, it reads the emotions for record keeping and inputs it to the database. This database it has the sampling and because it has the sampling it has all the other categories which is a motion data base different types have statements database; you can add change or delete samples to improve recognition. If you want to get rid of certain samples because they did not record right, or change them, (i.e. recorded with a cold) you need to be recognized so that you are authorized to do that In regard to FIG. 7, the operating system includes the hardware and software for secure private communication (Network VLAN) 701 including network and delivery 702 components for
 a. Instant messaging
 b. Unified messaging
 c. Meeting place
 d. IPCC (Information Processing Command and Control)
 e. RFID (Radio Frequency Identification)
 f. Video delivery to a location These features support the meeting location, regardless of what hardware is chosen.

Figure 7:
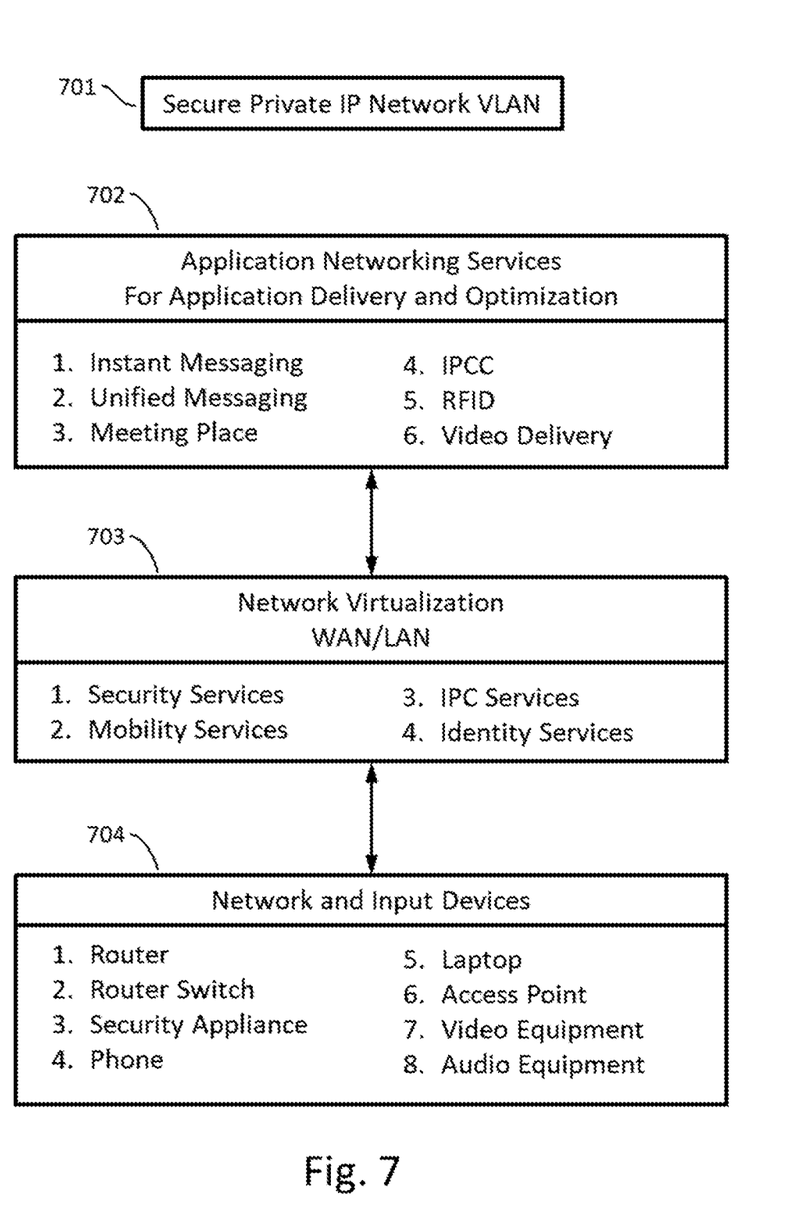
FIG. 7 shows an overview of the data gathering needed for an improved computer interface that is conversational.

The Network WAN/LAN 703 includes:
 a. Security services
 b. Mobility services
 c. Inter-process Communication (IPC) Services
 d. Identity Services The network and input devices 704 includes:
 a. Router
 b. Router Switch
 c. Security Appliance
 d. Connected Phone (wired or wireless)
 e. Laptop
 f. Access Point
 g. Video Equipment
 h. Audio Equipment These are hardware devices needed to communication with the operating system and access the User (biography) database.

To start the security service, a new user gets their picture taken, and then they speak into a microphone several phrases so the identity recognition software has data to identify the new user. Importantly, a phone number (or an email) is obtained for authorization and communication. It is important that both the new user and the communication device is recognized/registered.

Figure 9:
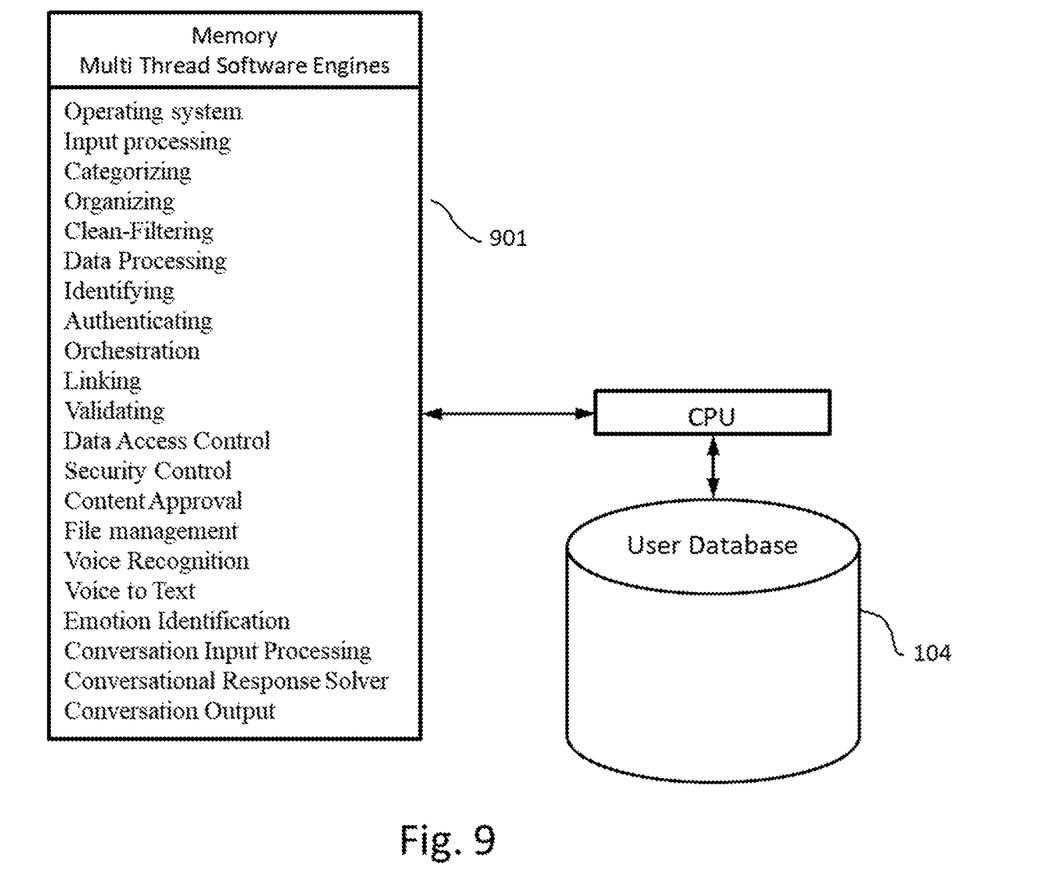
FIG. 9 shows a number of parallel software engines that run concurrently that are used to develop a computer simulated conversation.

FIG. 9 shows a number of parallel software engines that run concurrently that are used to develop a computer simulated conversation. A software stack 901 resides in the volatile memory and is utilized by the CPU, and additionally interfaces with the non-volatile memory user database to access and store needed files. They are all run under a computer operating system.

Figure 10:
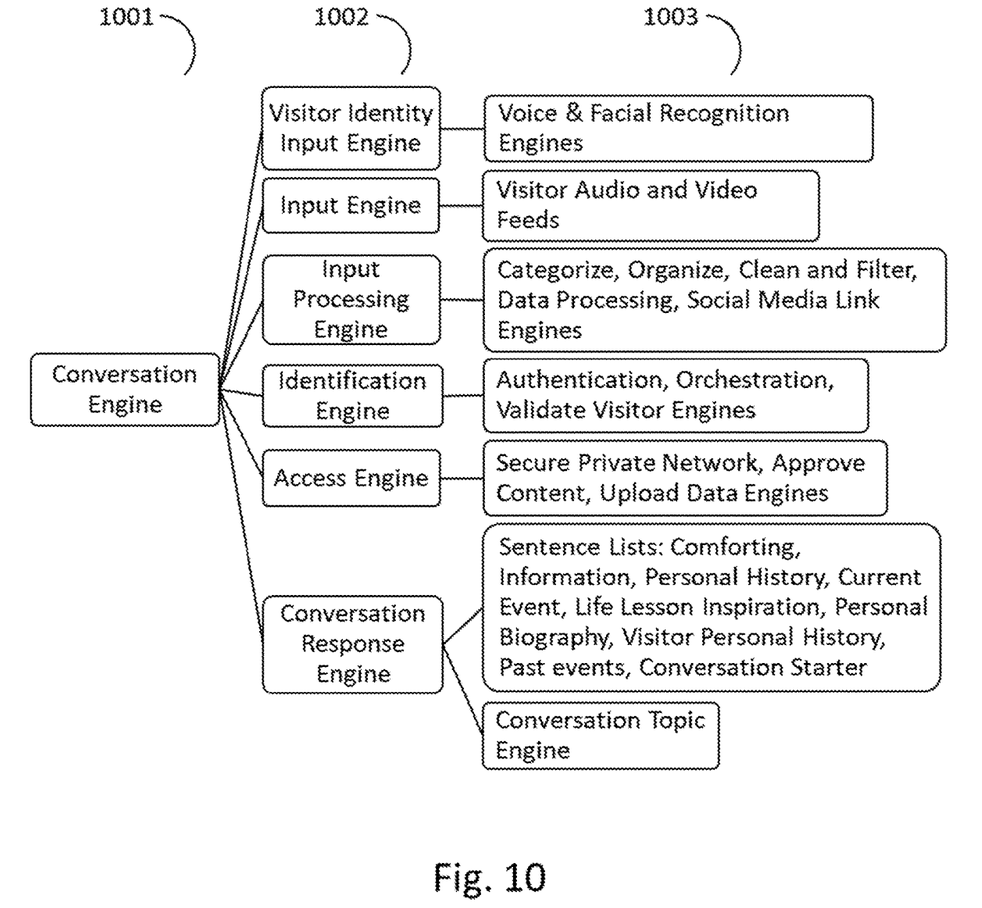
FIG. 10 shows important details of the conversation software engine.

FIG. 10 shows important details of the conversation software engine 1001, the software components 1002, and sub-components 1003 that make up a realistic conversation. Before a conversation with a visitor is allowed, the computer must correctly identify the person that the computer will address. To that end, a visitor identity input engine receives input from the voice and facial recognition engines of the visitor (from the camera and microphone in the visiting room), which utilizes the input engine, and then matches the voice and video data to the voice and facial features of the person it is trying to identify. With a match, the conversation engine speaks with a known person, and the personal database of the identified person is used to make the conversation more realistic.

If the person is not identified, the identity input engine asks the new visitor for identifying information, and requests approval from the administrator (via an email, text, or audio message) to be certified as part of the friends and family list that allows a computer simulated conversation. Also, previously stored information of the of any newly identified visitor can be used as part of the simulated conversation. That is, any social link connections that are part of other friends and family individuals that indicates any postings.

The simulated conversation needs to have clean audio input, so audio (and video) feeds must be processed by an input processing engine as previously mentioned in FIG. 1. Also, the input data from the visitor is checked for any personal database or mentions in social media links.

An access engine is used as previously mentioned in FIG. 2.

A conversation response engine is utilized to actually put words in the simulated display of the departed. The display chooses sentences from a list that are categorized according to comforting, information, etc. that are pertinent to the last response of the visitor. If the facial recognition shows worry, then the list of comforting sentences is chosen, and a particular sentence is chosen based on keywords in the last (or previous) comment from the visitor. If the visitor says, 'I worry about Mom' the computer might say in response: "I am sorry to hear that. Tell me more about your Mom". The two keywords are 'worry' and 'Mom' along with a voice tone and a facial expression of worry leads to the choice. The sentence contains a blank for 'Mom' that is filled in when speaking the sentence. Some sentences have blanks for filling in and some do not.

In a preferred embodiment, each stored sentence is extensively categorized in multiple levels such as visitor emotion, key words from the visitor, conversation topics, etc. For another example, if the visitor says, 'Dad, our sports team won! Isn't that great!' the computer would recognize a joyful emotion and chose a sentence from sports and from celebration. "I am glad to hear that the sports team won! Yay!" Also, the facial expression of the simulated image would be changed to happy.

Sometimes, a visitor would send conflicting signals. For example, the visitor might say, 'I am happy right now except for John.' The computer would recognize two keywords 'happy' and 'except' and then chose a sentence for additional information. The chosen sentence might say, "I see. Tell me more about John." The sentence in this case identifies the mixed sentence and chooses a sentence based on more than one keyword.

While various embodiments of the present invention have been described, the invention may be modified and adapted to various operational methods to those skilled in the art.

Therefore, this invention is not limited to the description and figure shown herein, and includes all such embodiments, changes, and modifications that are encompassed by the scope of the claims.

We claim:

1. A memorial facility including a room for having a secure and computer simulated interactive conversation with a departed person comprising:
    A) a storage facility for housing the remains of a plurality of departed persons,
    B) at least one visitation room,
    C) a storage area located within a first portion of said visitation room,
    D) said storage area having a container for human remains of said departed person,
    E) a conversation software engine that responds to visitor audio input further comprising:
        a) a visitor identity software engine that utilizes voice recognition or facial recognition to recognize a visitor,
        b) an input software engine,
        c) an input processing software engine,
        d) an identification software engine,
        e) an access engine to a personal biography,
        f) a conversation response software engine,
    F) said visitation room having a computer representation of said departed person by use of a video display and a speaking engine,
    G) said conversation software engine having access to needed data for said interactive conversation with said visitor, said needed data comprising:
        a) a personal biography database of said departed person residing in a user database,
        b) said personal biography database of said departed person includes a history of said departed person,
        c) recordings of past conversations with said visitor, and
        d) personal history of said visitor,
    H) said interactive conversation secured by geofencing of said visitation room,
    I) whereby said interactive conversation utilizes said needed data for said interactive conversation, and
    J) whereby said interactive conversation is secure.

2. The memorial facility for a departed person according to claim 1, wherein said input software engine further comprises:
    A) a visitor audio feed, and
    B) a visitor video feed.

3. The memorial facility for a departed person according to claim 1, wherein said input processing software engine further comprises:
    A) a categorize engine,
    B) an organizing engine,
    C) a clean and filter engine,
    D) a data processing engine, and
    E) a social media link engine.

4. The memorial facility for a departed person according to claim 1, wherein said identification software engine further comprises:
    A) an authentication software engine,
    B) an orchestration software engine, and
    C) a validate visitor software engine.

5. The memorial facility for a departed person according to claim 1, wherein said access engine further comprises:
    A) a secure private network software engine,
    B) an approve content software engine, and
    C) an upload data software engine.

6. The memorial facility for a departed person according to claim 1, wherein said conversation response software engine further comprises:
    A) a sentence selection engine, wherein said sentence selection engine chooses a sentence from a list catalog comprising:
        a) a comforting sentence list,
        b) an information sentence list,
        c) a personal history sentence list,
        d) a current event sentence list,
        e) a life lesson sentence list,
        f) an inspiration sentence list,
        g) a personal biography event sentence list,
        h) a visitor personal history sentence list,
        i) a past events sentence list, and
        j) a conversation starter list, and
    B) a conversation topic engine.

7. The memorial facility for a departed person according to claim 6, wherein said sentence selection engine matches sentence choices with key word inputs and visitor emotion inputs.

8. The memorial facility for a departed person according to claim 1, wherein said personal biography database includes historical and personal information about said departed person.

9. The memorial facility for a departed person according to claim 1, wherein said personal biography database includes images and videos of said departed person.

10. The memorial facility for a departed person according to claim 1, said personal biography database is accessible by a personal biography program located in:
A) a smart phone with a global positioning sensor,
B) a personal computer with a known IP address.

11. The memorial facility for a departed person according to claim 10, wherein said personal biography program further comprises:
A) archiving video into said personal biography database,
B) archiving images into said personal biography database, and
C) archiving written documents into said personal biography database.

12. The memorial facility for a departed person according to claim 11, wherein said personal biography database includes messages to be sent at a predetermined time or event.

13. The memorial facility for a departed person according to claim 1, wherein an administrator control function establishes editing and viewing content according to a predetermined condition.

14. The memorial facility for a departed person according to claim 1, a filtering engine that removes background noise from any audio recording.

15. The memorial facility for a departed person according to claim 1, any conversation by said visitor is recorded and stored in said user database.

16. The memorial facility for a departed person according to claim 1, said conversation software engine is linked to social media with a live feed.

17. The memorial facility for a departed person according to claim 1, wherein identification of said visitor utilizes at least 150 samples for facial or audio recognition.

18. The memorial facility for a departed person according to claim 10, wherein said personal biography database of said departed person is controlled by designated heirs.

19. The memorial facility for a departed person according to claim 1, wherein an automated timeline is created for life events of any said visitor according to a predetermined condition.

20. The memorial facility for a departed person according to claim 1, wherein a multi-thread central processing unit executes multiple software engines simultaneously.

21. The memorial facility for a departed person according to claim 1, wherein said conversation software engine additionally links to a social media of said visitor and family calendar events.

22. The memorial facility for a departed person according to claim 1, wherein future messages are sent out to specific people according to a timeline established in said personal biography database.

23. The memorial facility for a departed person according to claim 22, wherein said future messages comprise photo, audio, or video.

24. The memorial facility for a departed person according to claim 1, wherein linkage to social media posts are imported into said personal biography database.

25. The memorial facility for a departed person according to claim 1, wherein a date entry filed for said departed person death date allows post-life functionally to begin.

26. The memorial facility for a departed person according to claim 25, wherein said post-life functionally includes sending out messages and making information available on a tribute wall within said visitation room.

27. The memorial facility for a departed person according to claim 1, wherein an image of said departed person displays emotion based on said conversation software engine.

28. The memorial facility for a departed person according to claim 1, wherein said conversation software engine identifies the voice affection of said visitor.

29. The memorial facility for a departed person according to claim 1, wherein said personal biography database for the deceased is secured by a designated administration function that sets up access for modifying or adding to said personal biography database.

30. The memorial facility for a departed person according to claim 1, wherein private information about said departed person is only accessible in said visitation room.

31. The memorial facility for a departed person according to claim 10, wherein a first time said visitor is given a guest account in said personal biography database.

32. The memorial facility for a departed person according to claim 31, wherein said personal biography program is used to add and edit biography information.

33. The memorial facility for a departed person according to claim 32, wherein said personal biography program creates a linear timeline of stored information.

34. The memorial facility for a departed person according to claim 1, wherein said personal biography database is secured from unauthorized access by using server protection.

35. The memorial facility for a departed person according to claim 1, wherein messages from said departed person are presented through a talking computer projection of said departed person.

36. The memorial facility for a departed person according to claim 35, wherein said talking computer projection is presented via computer animation having a facial image that responds to said visitor by with the visitor by showing emotion.

37. The memorial facility for a departed person according to claim 36, wherein said emotion includes smiling and frowning.

* * * * *